Aug. 4, 1970 J. G. EVANS 3,522,559

COAXIAL BLOCKING CAPACITOR STRUCTURE WITH IMPEDANCE MATCHING ADJUSTMENT

Filed Aug. 16, 1967

INVENTOR
J. G. EVANS
BY Alfred G. Steinmetz
ATTORNEY 3,522,559

COAXIAL BLOCKING CAPACITOR STRUCTURE WITH IMPEDANCE MATCHING ADJUSTMENT

James G. Evans, Englishtown, N.J., assignor to Bell Telephone Laboratories, Incorporated, Murray Hill, N.J., a corporation of New York Filed Aug. 16, 1967, Ser. No. 661,067
Int. Cl. H03h 7/38
U.S. Cl. 333—33 4 Claims

ABSTRACT OF THE DISCLOSURE

A coaxial blocking capacitor structure utilizing a standard capacitor as the inner conductor includes apparatus to adjust its characteristic impedance to match that of a coaxial transmission facility to which it is connected. A deformable trimmer capacitor plate is used to introduce a capacitance between the soldered lead of the capacitor, connected to the coaxial transmission facility, and the outer conductor of the capacitor structure. This introduced capacitance in combination with the parasitic inductance of the soldered leads establishes a characteristic impedance which may be adjusted to match that of the coaxial transmission facility.

FIELD OF THE INVENTION

This invention relates to a coaxial blocking capacitor structure and more particularly to a coaxial blocking capacitor structure including impedance matching apparatus to adjust the characteristic impedance of the coaxial structure to that of a coaxial transmission facility to which it is connected.

BACKGROUND OF THE INVENTION

In high frequency coaxial transmission systems, it is frequently desirable to isolate the DC signal level in one part of the system from the DC signal level in another part of the system. Such DC signal level isolation is necessary, for instance, in the conducting of high frequency tests in a coaxially designed transmission test set to determine the high frequency signal response of a transistor. In such tests the high frequency measuring apparatus is isolated, by means of a blocking capacitor, from the DC bias signals which are applied to the transistor. The blocking capacitor is preferably housed in a coaxial structure to facilitate connections to the coaxial transmission facilities of the test set. The impedance of the coaxial blocking capacitor structure is matched to the characteristic impedance of the coaxial transmission facilities of the test set to minimize undesirable test signal reflections which adversely affect the test measurements.

A typical coaxial blocking capacitor structure includes a blocking capacitor mounted in a specially designed coaxial housing having the same characteristic impedance as the coaxial transmission facility to which it is connected. One such structure is described, for instance, in the Bell System Technical Journal, vol. 40, pp. 870–871, May 1961 and comprises a tubular capacitor fitted at its terminals with conically tapered electrodes which together form the inner conductor of a coaxial transmission structure. The outer conductor of the coaxial structure is shaped to match the contour of the inner conductor and, in addition, maintain the correct relative dimensions with respect to the inner conductor to match its characteristic impedance to that of the coaxial transmission facility to which it is connected. This particular blocking capacitor structure is difficult and expensive to produce because of the critical dimensional tolerances required in the tapered electrodes and the matching coaxial housing to achieve the desired characteristic impedance. If the characteristic impedance of the connected coaxial transmission facility differs from this desired characteristic impedance, the characteristic impedance of the aforedescribed coaxial capacitor structure cannot be altered to achieve an impedance match. Hence the resulting impedance mismatch at each terminal of the coaxial blocking capacitor structure causes undesirable signal reflections in the test signal.

An object of the invention is to permit the economical construction of a coaxial blocking capacitor structure having an adjustable charactreistic impedance and additionally permit impedance matching with the characteristic impedances of connected coaxial transmission facilities.

Another object of the invention is to secure an independent impedance match with the characteristic impedance of connected coaxial transmission facilities at each terminal of the blocking capacitor structure.

Yet another object of the invention is to construct a coaxial blocking capacitor structure without the necessity of constructing an inner conductor capacitor structure having a conductor contour specially shaped to match the contour of the outer conductor.

SUMMARY OF THE INVENTION

Therefore, in accord with the present invention, a coaxial blocking capacitor structure includes internal characteristic impedance adjustment apparatus to independently adjust its characteristic impedance at each of its connecting terminals to match the characteristic impedance of the connecting coaxial transmission facility. Within the coaxial structure, the blocking capacitor is connected to the coaxial connecting terminals, via soldered connecting leads. These soldered connecting leads have parasitic inductance impedance components. The internal characteristic impedance adjustment apparatus is utilized to neutralize this parasitic inductance with capacitance to the extent necessary to match the characteristic impedance of the blocking capacitor structure at each coaxial connecting terminal to the characteristic impedance of the connected coaxial transmission facility.

The internal characteristic impedance adjustment apparatus in accordance with the invention comprises a deformable trimmer capacitor plate affixed to a supporting structure connected to the outer conductor of the coaxial structure. The opposite edges of the deformable trimmer capacitor plate are adjusted substantially adjacent to the soldered connecting leads to neutralize their inherent parasitic inductance impedance component to the extent necessary to achieve the desired characteristic impedance match.

A feature of the present invention is the independence of the capacitive adjustment at each coaxial connecting terminal of the capacitor structure which thereby permits an independent characteristic impedance match with the coaxial transmission facility attached to each connecting terminal.

Another feature of the invention is the economic simplicity of the coaxial structure and the impedance adjustment apparatus in which the internal conductor contour need not match the outer conductor contour in order to achieve certain desired characteristic impedances. This feature readily permits the characteristic impedance of a rectangular coaxial blocking capacitor structure to be matched to that of a circular coaxial transmission facility.

DRAWING

A complete understanding of the invention and a further description of its many objects and features may be obtained upon consideration of the following detailed description of an illustrative embodiment of the invention taken in conjunction with the accompanying drawing in which.

DETAILED DESCRIPTION

In coaxial high frequency transmission systems all the transmission components in the transmission path of the system should preferably have identical characteristic impedances to avoid signal reflections at the junctions interconnecting one transmission component to another. In the case of a blocking capacitor inserted in the transmission path and used to isolate DC signal levels in one part of the transmission system from another part of the transmission system, its characteristic impedance must match that of the transmission path to minimize undesirable signal reflections.

Figure 1:
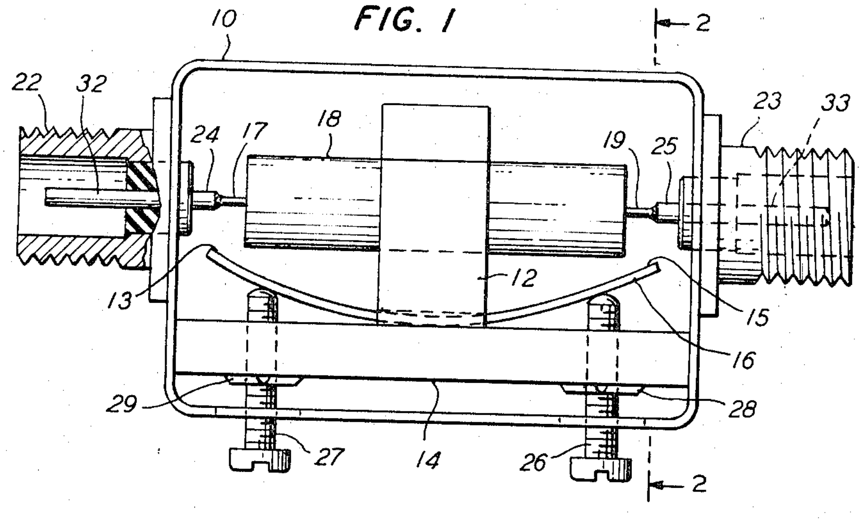
FIG. 1 is one view of a coaxial blocking capacitor structure including the characteristic impedance adjustment apparatus in accord with the principles of the invention.

Referring to FIG. 1, a coaxial blocking capacitor structure, which may be utilized to interconnect two coaxial transmission facilities, is shown. The blocking capacitor structure is embodied in a rectangular coaxial structure and the connecting terminals are designed to attach to a circular structured coaxial transmission facility. The relative physical dimensions of the inner conductor comprising the blocking capacitor 18 and the outer conductor comprising the case structure 10 are selected to secure a characteristic impedance which is approximately equal to that of the connecting coaxial transmission facilities to which it is connected. The inner conductor comprises only the capacitor 18 and in accord with the invention need not be specially contained in a structure with a contour exactly matching the contour of the outer conductor case structure 10.

The blocking capacitor 18 is mounted in a capacitor clamp 12 which is preferably constructed of a nonconducting material, such as plastic. The capacitor clamp 12 is in turn mounted on a clamp support 14. The clamp support 14 is made of a conducting material, such as brass, so as not to attenuate the internal electrical field of the coaxial structure. The clamp 12 and the support 14 fix the positional relation of the capacitor 18 to the outer conductor case structure 10. It is to be understood that, while it is desirable to use a capacitor, as shown, with a substantially rectangular configuration, tubular and other shapes of a capacitor may be used in its place. The principle of the invention permits impedance matchting and adjustment thereof regardless of the shape of the capacitor.

The capacitor 18 is asymmetrically positioned within the outer conductor case structure 10, so as to be positioned at its electrical center, due to the nullification of the electrical field within the conducting material comprising the clamp support 14. Two coaxial connectors 22 and 23 coupled to the opposite terminals of the capacitor 18 are attached to the outer conductor case structure 10 and are utilized to establish connections between the blocking capacitor 18 and the coaxial transmission facilities of the transmission system.

The opposite leads 17 and 19 of the blocking capacitor 18 are connected to the center conductors 32 and 33 of the coaxial connectors 22 and 23 by means of the soldered connections 24 and 25. The soldered connections 24 and 25 each have a parasitic inductance impedance. This parasitic inductance impedance is connected in series with the distributed inductance of the coaxial transmission facility which is connected to the coaxial connectors 22 and 23 and comprises a portion of the characteristic impedance of the coaxial capacitor structure.

Mounted on the clamp support 14 is a deformable trimmer capacitor plate 16 whose opposite capacitor edges 13 and 15 are positioned substantially adjacent to the soldered connections 24 and 25. The center portion of the trimmer capacitor plate is clamped to the clamp support 14 by means of the capacitor clamp 12, which is affixed thereto.

The opposite capacitor edges 13 and 15 are unrestrained to permit adjustment thereof. The proximity of the unrestrained capacitor edges 13 and 15 to the soldered connections 24 and 25 is controlled by the adjusting screws 26 and 27 which exert pressure on the opposite capacitor edges of the trimmer capacitor plate 16 causing it to deform. The adjusting screws 26 and 27 are mounted in the clamp support 14 and include the tension supports 28 and 29 which apply friction to the screw threads to stabilize the screw adjustment.

The positioning of the capacitor edges 13 and 15 within close proximity to the soldered connections 24 and 25 introduces a capacitance effect between these soldered connections and the outer conductor case structure 10, which is in parallel to the distributed capacitance of the coaxial transmission facility which is connected to the coaxial connectors 22 and 23. This introduced capacitance partially neutralizes the parasitic inductance of the soldered connections 24 and 25. The amount of capacitance between the soldered connections 24 and 25 and the outer conductor case structure 10 is controlled by the position of the capacitor edges 13 and 15 with respect to the soldered connections 24 and 25. By adjusting the proximity of the capacitor edges 13 and 15 to the soldered connections 24 and 25, the characteristic impedance of the capacitor structure at each of the coaxial connecting terminals 22 and 23 can be altered to match the characteristic impedance of the connected coaxial transmission facility and thereby minimize undesired signal reflections.

The adjustment, to match the characteristic impedance of the blocking capacitor structure to the characteristic impedance of the coaxial transmission of facility, may be performed by attaching the end terminal of the coaxial transmission facility to a null type measuring apparatus and calibrating a null meter setting. The coaxial connectors 22 and 23 are in turn connected to the null type measuring apparatus and the capacitor edges 13 and 15 are adjusted until the measurement reading coincides with the null measurement setting.

Figure 2:
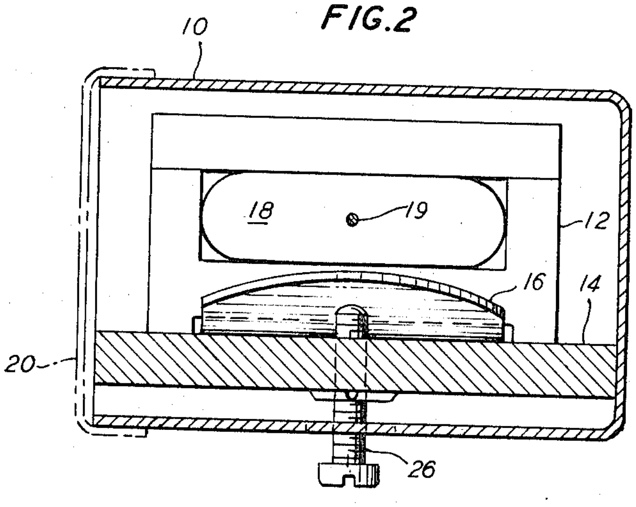
FIG. 2 is another view of the coaxial blocking capacitor structure shown in FIG. 1.

A side view of the coaxial blocking capacitor structure in FIG. 2 shows an outer conductor cover 20 which completes the outer conductor enclosure of the coaxial structure. The components in FIG. 2 corresponding to those in FIG. 1 are identified with the same reference numbers and hence a detailed explanation of their function is not believed necessary.

Figure 3:
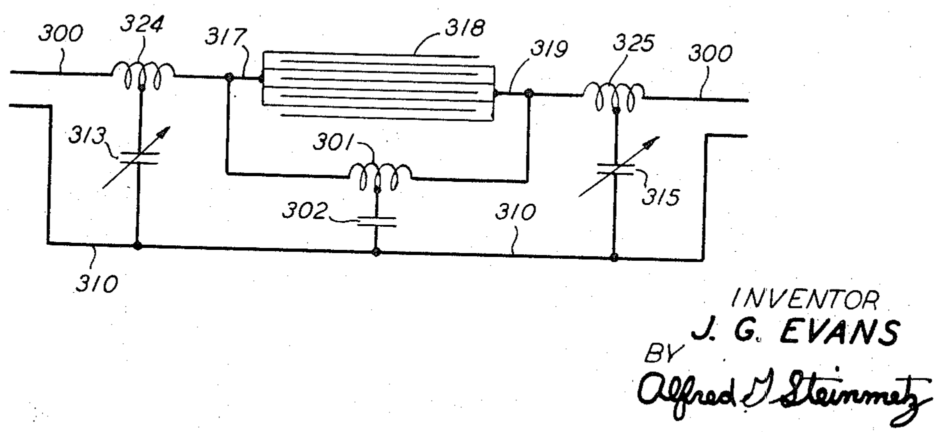
FIG. 3 is a schematic circuit diagram illustrating the electrical properties of the coaxial blocking capacitor structure shown in FIGS. 1 and 2.

The circuit schematic shown in FIG. 3 illustrates the electrical characteristics of the coaxial blocking capacitor structure disclosed in FIGS. 1 and 2. The lead 310 represents the outer conductor of the coaxial structure and the lead 300 represents the inner conductor. The blocking capacitor 318 may comprise a metalized polyester film capacitor of low inductance extended foil type construction which as shown has a plurality of interleaved electrodes. The inductors 324 and 325 connected to the opposite capacitor leads 317 and 319 represent the parasitic inductance of the soldered connections; the adjustable capacitors 313 and 315 represent the capacitance introduced between the inner and outer conductors by the proximity of the capacitor edges of the trimmer capacitor plate to the soldered connections. The inductance 301 and the capacitance 302 represent parasitic impedances of the capacitor 318.

It will be readily apparent to those skilled in the art that the appropriate adjustment of the capacitors 313 and 315 permits the characteristic impedance at each terminal of the capacitor structure to be adjusted to match the distributed characteristic impedance of the conneced coaxial transmission facility at each terminal, and hence damaging test signal reflections can be minimized.

It is additionally apparent that by utilizing the same trimmer capacitor plate in common to both of the soldered connections that a smooth characteristic impedance transition can be achieved between the characteristic impedance established at the opposite terminals of the coaxial blocking capacitor structure. This smooth transition from the characteristic impedance at one terminal to the characteristic impedance at the other terminal greatly minimizes test signal reflections even if the characteristic impedances of the coaxial transmission facilities connected to the opposite coaxial connectors are slightly different.

While the above invention has been described with respect to one specific illustrative embodiment, many variations of the invention will suggest themselves to those skilled in the art without departing from the spirit and scope of the invention.

What is claimed is:

1. A coaxial blocking capacitor structure comprising a blocking capacitor including two terminal leads respectively attached to its oppositely poled electrodes, an outer conductor structure including support apparatus to hold said blocking capacitor in position, two coaxial connectors to connect said blocking capacitor structure to a coaxial transmission facility, soldered connections to attach said two terminal leads to said two coaxial connectors, a trimmer capacitor plate having its opposite edges positioned substantially adjacent to said soldered connections and a supporting structure to connect said trimmer capacitor plate to said outer conductor, adjusting screws mounted in said supporting structure to adjust the proximity of said edges of said trimmer capacitor plate with respect to said soldered connections, said trimmer capacitor plate introducting a capacitance between said soldered connections and said outer conductor structure to alter the parasitic inductance of said soldered connections.

2. A coaxial blocking capacitor structure according to claim 1 further including means to clamp said trimmer capacitor plate to said support apparatus opposite said blocking capacitor permitting a capacitance effect between said capacitor and said trimmer capacitor plate.

3. A coaxial capacitor structure comprising a blocking capacitor including two terminal leads, a coaxial housing enclosing said blocking capacitor including two coaxial connectors to join said coaxial blocking capacitor structure to a coaxial transmission facility and support apparatus to hold said blocking capacitor in position, soldered connections to interconnect said terminal leads to said coaxial connectors, a deformable metallic plate with its center attached to said support apparatus and its opposite edges positioned respectively substantially adjacent so said soldered connections, said support apparatus being electrically coupled to said coaxial housing and adjustment means to control the distance of said opposite edges of said deformable metallic plate from said soldered connections whereby the inductance of the soldered connections is neutralized by the adjusted capacitance of said deformable metallic plate.

4. A coaxial capacitor structure as defined in claim 3 wherein said adjustment means comprises adjusting screws mounted in said supporting structure and positioned to exert pressure on said opposite edges to deform said deformable metallic plate.

References Cited

UNITED STATES PATENTS

| | | | |
|---|---|---|---|
| 3,320,556 | 5/1967 | Schneider | 333—34 |
| 3,259,859 | 7/1966 | Jessen | 333—81 |
| 3,417,350 | 12/1968 | Cruz | 333—35 |

OTHER REFERENCES

Leed and Rummer: Bell System Tech. Journal, May 1961, pp. 870–71, "A Loss of Phase Set."

HERMAN K. SAALBACH, Primary Examiner

C. BARAFF, Assistant Examiner

U.S. Cl. X.R.

333—73, 35; 324—128